United States Patent [19]  
Kawashima et al.

[11] Patent Number: 4,982,276  
[45] Date of Patent: Jan. 1, 1991

[54] FOCUSSING ADJUSTMENT CHANGEOVER CIRCUIT FOR PROJECTION TV RECEIVER

[75] Inventors: Masahiro Kawashima; Kazuyasu Yamamoto; Tsutomu Nishida, all of Osaka, Japan

[73] Assignee: Matsushita Electric Industrial Co., Ltd., Japan

[21] Appl. No.: 301,524

[22] Filed: Jan. 23, 1989

[51] Int. Cl.$^5$ .................... H04N 9/31; H04N 17/04
[52] U.S. Cl. ............................. 358/60; 358/10
[58] Field of Search ............... 358/217, 218, 219, 60, 358/64, 29, 10, 231, 242, 237; 353/31, 32, 33; 315/382, 382.1

[56] References Cited

U.S. PATENT DOCUMENTS

| 3,501,673 | 3/1970 | Compton | 315/382 |
| 4,584,596 | 4/1986 | Tallant | 358/10 |
| 4,731,564 | 3/1988 | Pan et al. | 358/10 |
| 4,746,973 | 5/1988 | Ohsuga et al. | 358/60 |

FOREIGN PATENT DOCUMENTS

| 0087992 | 5/1983 | Japan | 358/29 |
| 0186185 | 9/1985 | Japan | 358/29 |
| 62-185491 | 8/1987 | Japan | |
| 1-27385 | 1/1989 | Japan | |

Primary Examiner—John W. Shepperd  
Assistant Examiner—Amir Zarabian  
Attorney, Agent, or Firm—Lowe, Price, Leblanc, Becker & Shur

[57] ABSTRACT

A focus adjustment changeover circuit for a projection display television receiver having red, green and blue-emission CRTs includes a changeover switch for selecting an operating mode in which a level of current is supplied to the static focus coil of the blue-emission CRT such as to precisely focus the electron beam of that CRT, so that projection lens focus adjustment for that CRT can be easily performed with a test pattern signal being projected, and an operating mode in which the current supplied to that static focus coil causes the electron beam of the blue CRT to be slightly defocused, so that white balance adjustment of the television receiver can be executed while a television picture is projected.

2 Claims, 4 Drawing Sheets

FOCUSSING ADJUSTMENT CHANGEOVER CIRCUIT FOR PROJECTION TV RECEIVER

BACKGROUND OF THE INVENTION

1. Field of Application

The present invention relates to a focus adjustment changeover circuit for facilitating the execution of focus adjustment and white balance adjustment of a projection display television receiver.

2. Prior Art Technology

With a generally utilized form of projection display television receiver, three separate cathode ray tubes (hereinafter abbreviated to CRTs) are utilized which have respective red, green and blue phosphors, for projecting respective red, green and blue television pictures. These three CRT pictures are projected onto a single display screen by projection lenses. The red, green and blue television pictures are thereby superimposed on the screen to form a projected color television picture. Generally, the emission characteristics of the phosphors of these CRTs, i.e. the relationships between CRT drive voltage and brightness of emitted light, are of the form illustrated in FIG. 1. In FIG. 1, numeral 1 denotes the emission characteristic for the green CRT and numeral 2 the emission characteristic for the red CRT, when the respective electron beams of these CRTs are precisely focused by the electron lenses of the CRTs, e.g. to produce a minimum spot size by each electron beam. Numeral 3 denotes the emission characteristic of the blue CRT under such a condition of precise focus of the electron beam, while numeral 4 denotes the characteristic of the blue CRT under a condition in which the electron beam of that tube is slightly defocused by the electron lens of the tube. This condition of slight defocusing will be referred to in the following as the defocused state. As can be seen for FIG. 1, the emission characteristic of each of the red and green CRTs is substantially linear up to high levels of drive voltage, i.e. up to high values of electron beam current. However the emission characteristic of the blue CRT exhibits a saturation condition at high levels of beam current i.e. the emission characteristic of the blue phosphor exhibits saturation at lower levels of CRT drive voltage than do the red and green phosphors. As a result, even if the white balance of the projected television picture is adjusted to be correct at some moderate level of display brightness, the white color produced on the display screen by combining light from the red, blue and green CRTs will have an insufficient level of blue component and so will have an excessively low color temperature, i.e. will not produce a pure white color, at high levels of emitted light.

However as illustrated by curve 4, this problem of saturation of the blue phosphor is alleviated to some extent if the electron beam of the blue CRT is operated in a slightly defocused condition, rather than being precisely focused. For this reason it is usual to operate the blue CRT in this slightly defocused condition, in order to provide a more accurate white balance at high levels of CRT drive voltage, and to execute white balance adjustment of the television receiver with the blue CRT in this defocused state.

This has however the disadvantage that problems arise when focusing adjustment of the projection lens of the blue CRT is executed. Specifically, this projection lens adjustment (e.g. performed while observing a crosshatch test pattern that is projected on the display screen by the blue CRT) is made difficult by the fact that the blue electron beam is defocused, and also by the fact that a projected image in blue light has inherently low visibility by comparison with a green or a red image. For this reason such a projection display television receiver is made operable in two types of adjustment modes, i.e. a mode in which electromagnetic focusing of the respective electron beams is established such that only the blue CRT is set in the defocused state and the red and green CRTs in the precisely focused state, so that white balance adjustment can be executed, and a mode in which electromagnetic focusing is established such that all of the CRTs are set in the precisely focused state, so that projection lens focus adjustment can be executed.

An example of a prior art focus adjustment changeover circuit will be described referring to FIG. 2, in which it is assumed that electromagnetic focusing of each CRT is utilized. Numeral 5 denotes an input terminal coupled to receive a video signal for producing a normal television picture, while an input terminal 6 is coupled to receive an adjustment signal which is a crosshatch test pattern signal, to produce a crosshatch test pattern picture that is utilized during focus adjustment and white balance adjustment operation. These signals from the input terminals 5 and 6 are selectively transferred to a video processing circuit 7 by a switch 8, and circuit 7 thereby produces video projection signals that are applied to drive red, green and blue CRTs (not shown in the drawings). Numerals 9, 10 and 11 denote respective static focus coils for performing static electrical focusing of the electron beams of the blue, red and green CRTs. Numerals 12, 13 and 14 denote current stabilizer circuits for supplying respective currents to the static focus coils 9, 10 and 11 respectively for static focus control. Each of the circuits 12, 13 and 14 is configured as shown for current stabilizer circuit 12, i.e. including a pair of transistors 15 and 16 which are connected in common-emitter configuration, and drive and feedback transistors 17 and 18.

An input terminal 19 is coupled to receive a parabola waveform voltage signal during each vertical scanning period, for vertical focus control. This signal is amplified by a transistor 20, and is then adjusted in amplitude by means of a potentiometer 21 and transferred through respective capacitors of a capacitor group 22 to the bases of the respective transistors 15 of the current stabilizer circuits 12, 13 and 14. In this way, electron beam focus deviations between the center and the upper and lower regions of the projected picture are corrected.

Numerals 23, 24 and 25 denote respective potentiometers which are utilized for static focus adjustment of the blue, green and red CRTs respectively. DC voltages derived from these potentiometers, adjusted to provide appropriate levels of electromagnetic focus currents, are applied through respective ones of a set of resistors 26 to the bases of the respective ones of transistors 15 of the current stabilizer circuits 12, 13 and 14. Static focus adjustment of the electromagnetic focus currents of the focus coils 9, 10 and 11 of the blue, green and red CRTs can thereby be mutually independently executed.

Focus adjustment of a projection display television receiver by utilizing such a prior art apparatus is executed in two stages. In a first stage, the changeover switch 8 is set to supply the crosshatch test pattern signal from the input terminal 6 to the video processing circuit 7. A crosshatch test pattern is thereby projected on the display screen of the television receiver by the CRTs. In this condition, the potentiometers 23, 24 and 25 are respectively adjusted such as to vary the levels of DC voltage applied to the bases of the transistors 15 of the current stabilizer circuits 12, 13 and 14, to set the levels of current flow in each of the electromagnetic focus coils 9, 10 and 11 such as to precisely focus the electron beams of each of the blue, green and red CRTs. When this has been completed, optical focusing of the respective projection lenses of the blue, green and red CRTs is executed to attain an optimum focus condition of each of the blue, green and red images projected on the display screen.

In the second stage, the changeover switch 8 is set such as to supply the signal from input terminal 5 to the video processing circuit 7, for thereby projecting a television picture. The focus adjustment potentiometer 23 for the blue CRT is then adjusted such as to slightly defocus the electron beam of the blue CRT. White balance adjustment of the projection display television receiver is then executed, with the color temperature of the projected picture at high levels of brightness being improved due to the slightly defocused state of the electron beam of the blue CRT as described hereinabove.

Each time that the installation conditions of a projection display television receiver are altered, (i.e. when the television receiver is moved to a different location, or the distance to the display screen is altered, etc) it is necessary to repeat the two steps described above, in order to first adjust the focus of the projection lenses and then re-adjust the white balance. However with such a prior art focus adjustment circuit, each time that these two steps must be repeated in this way, it is necessary to first adjust the potentiometer 23 for changing the electromagnetic focusing of the electron beam of the blue CRT from the defocused state described above to the precisely focused state, then to execute focusing of the projection lenses, then to again adjust the potentiometer 23 to return the potentiometer 23 to a position which provides the defocused state of the blue CRT. It is therefore necessary to frequently make delicate adjustments to the electromagnetic focus potentiometer 23. Furthermore since such adjustment of the potentiometer 23 is executed manually, fixedly predetermined adjustment statuses cannot be ensured, so that it is difficult to establish the defocused state and the precisely focused state for the blue CRT each time that such an adjustment procedure is performed.

SUMMARY OF THE INVENTION

It is an objective of the present invention to provide a focus adjustment changeover circuit whereby alteration of the setting of the static electromagnetic focus state of the blue CRT of a projection display television receiver, in order to execute projection lens focus adjustment when the installation conditions of the CRT are altered, can be carried out in a simple and easy manner.

It is a further objective of the present invention to provide a focus adjustment changeover circuit whereby alteration of a projected picture used for adjustment purposes can be executed simultaneously with alteration of the static electromagnetic focus state of the blue CRT of a projection display television receiver, when projection lens focus adjustment is to be executed.

To achieve the above objectives, a focus adjustment changeover circuit according to the present invention for a projection display television receiver according to a first embodiment comprises:
externally operable mode changeover switch means; and,
circuit means responsive to the changeover switch means for selectively establishing as two mutually separate modes of operation a first mode in which a focus current level is set to provide precise electromagnetic focusing of a cathode ray tube of the projection display television receiver and a second mode in which the focus current level is set to provide an electromagnetically defocused condition of the cathode ray tube;
and is characterized in that the first mode is selected when projection lens focus adjustment of the projection display television receiver is to be executed and the second mode is selected when white balance adjustment of the is to be executed.

According to a second embodiment, a focus adjustment changeover circuit according to the present invention further comprises second changeover switch means coupled to be actuated together with the mode changeover switch means for selecting a test pattern signal, generated internally within the projection display television receiver, to be supplied as a drive signal to the cathode ray tube when the first mode is selected, and for selecting a color video signal to be supplied as a drive signal to the cathode ray tube when the second mode is selected.

DESCRIPTION OF PREFERRED EMBODIMENTS

Figure 1:
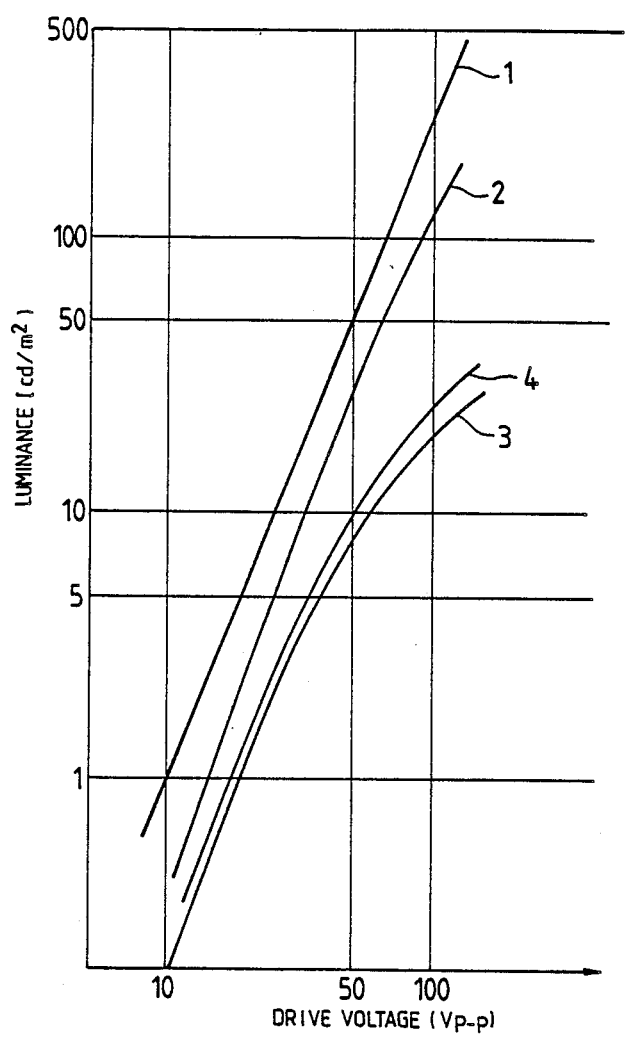
FIG. 1 shows emission characteristics of green, red and blue CRTs of a projection display television receiver.
Figure 2:
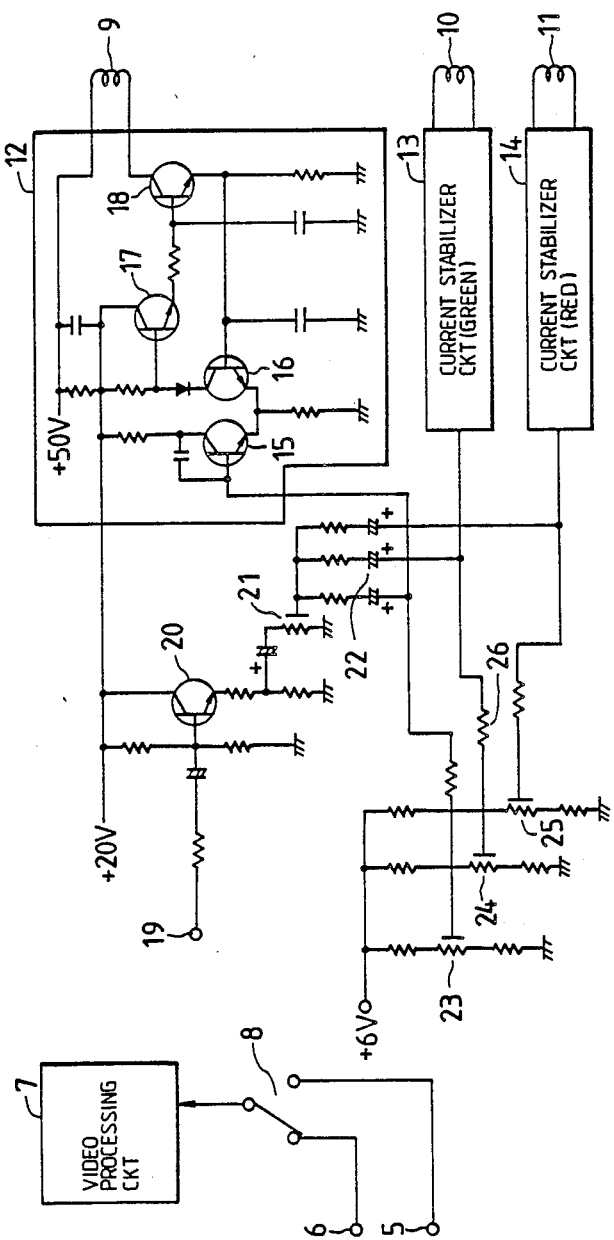
FIG. 2 is a circuit diagram of an example of a prior art focus adjustment circuit for a projection display television receiver.
Figure 3:
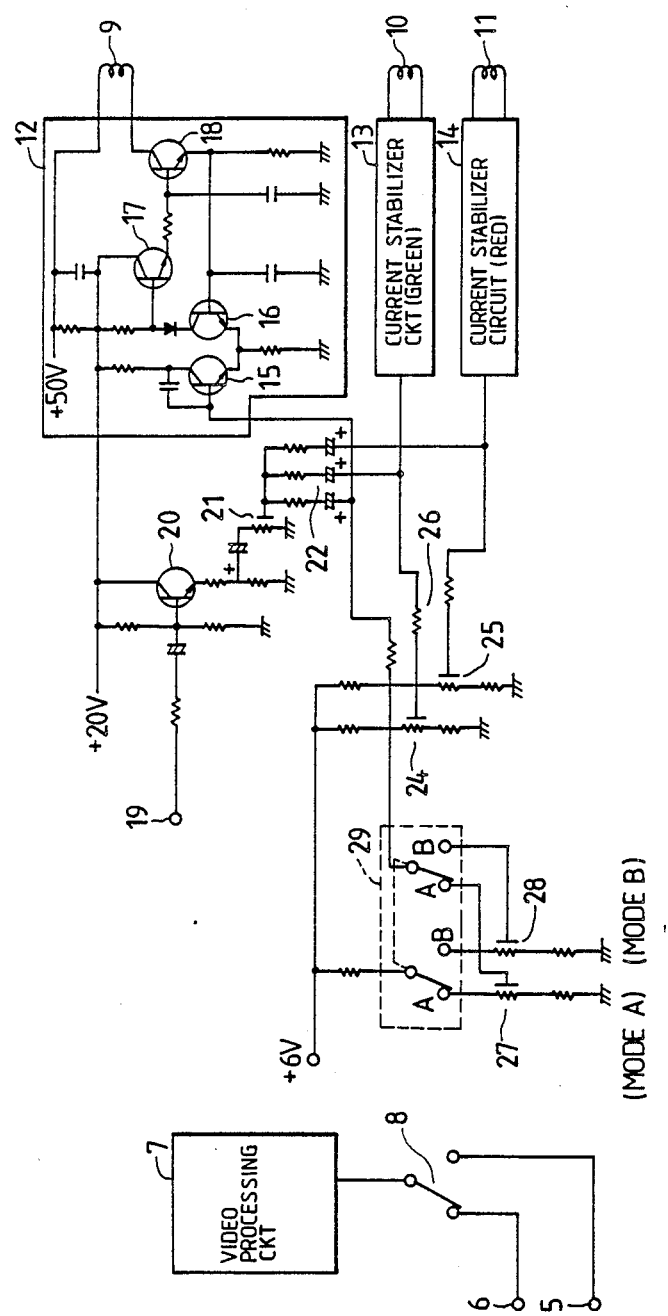
FIG. 3 is a circuit diagram of a first embodiment of a focus adjustment changeover circuit according to the present invention; and, FIG. 4 is a circuit diagram of a second embodiment of a focus adjustment changeover circuit according to the present invention.

FIG. 3 is a circuit diagram of a first embodiment of a focus adjustment changeover circuit according to the present invention. In FIG. 3, components which are identical to components in the prior art example of FIG. 2 are designated by corresponding reference numerals, and further description of these will be omitted. Numerals 27 and 28 denote respective electromagnetic focus adjustment potentiometers which are used to set the levels of focus current flowing in the focus coil 9 of the blue CRT to the precisely focused state and the defocused state (described hereinabove) respectively. A changeover switch 29 functions as a focus mode selection switch, for selectively establishing two modes which will be designated as modes A and B in the following, and which are selected when the input terminals A and input terminals B of the mode changeover switch 29 shown in FIG. 3 are selected, respectively. In this embodiment, mode A is the precisely focused state, in which the electron beams of all of the CRTs including the blue CRT are optimally focused. This mode is used for adjustment of the projection lens focus. Mode B is the condition in which the electron beam of the blue CRT is set in the defocused state, and is used for white balance adjustment. At the time of initial set-up adjustment of the television receiver, the mode changeover switch 29 is set for mode A, so that a focus adjustment voltage produced from the electromagnetic focus adjustment potentiometer 27 is supplied to the base of transistor 15 of the current stabilizer circuit 12 of the blue CRT. In addition, switch 8 is set to supply a crosshatch test pattern signal to the video processing circuit 7, as described above, such that this pattern is projected on the display screen by the blue CRT. The level of current which flows in the blue static focus coil 9 is then adjusted by variation of the potentiometer 27, to set the blue CRT in a precise electromagnetic focus condition. In this state, the projection lens of the blue CRT is rotated until optimum optical focusing of that lens is attained.

Next, switch 29 is set to select the B mode, whereby a focus adjustment voltage from the electromagnetic adjustment potentiometer 28 is supplied to the base of transistor 15 of current stabilizer circuit 12, and the switch 8 is changed over to supply the color video signal from input terminal 5 to the video processing circuit 7. The level of current which flows in the blue static focus coil 9 is then adjusted by variation of the potentiometer 28 to set the electron beam of the the blue CRT in the slightly defocused state described hereinabove. White balance adjustment is then carried out.

Subsequently, whenever it again becomes necessary to execute adjustment of the projection lenses and white balance adjustment, e.g. when the projection display television receiver is moved to be installed at a different location, then it is only necessary to change from mode B to mode A by actuating the mode changeover switch 29 (and also actuating switch 8), to set the blue CRT in the precise electromagnetically focused state, so that projection lens focus adjustment can be executed. Thus, it is no longer necessary to further adjust the focus current supplied to focus coil 9 of the blue CRT when such projection lens focusing is to be performed. Similarly, after this projection lens focus adjustment has been completed and the blue CRT is to be returned to the defocused state for execution of white balance adjustment, it is only necessary to actuate switch 28 to restore mode B operation (with switch 8 being changed over to select input 5), whereby the blue CRT is restored to the defocused state, so that white balance adjustment can then be immediately performed without any readjustment of the focus current of coil 9 of the blue CRT. It can thus be understood that these electromagnetic and optical focus adjustment operations can be executed much more rapidly and conveniently than has been possible in the prior art, while in addition the two selectable levels of focus current for the blue CRT can be initially fixed with a high degree of accuracy, and thereafter left unchanged.

Figure 4:
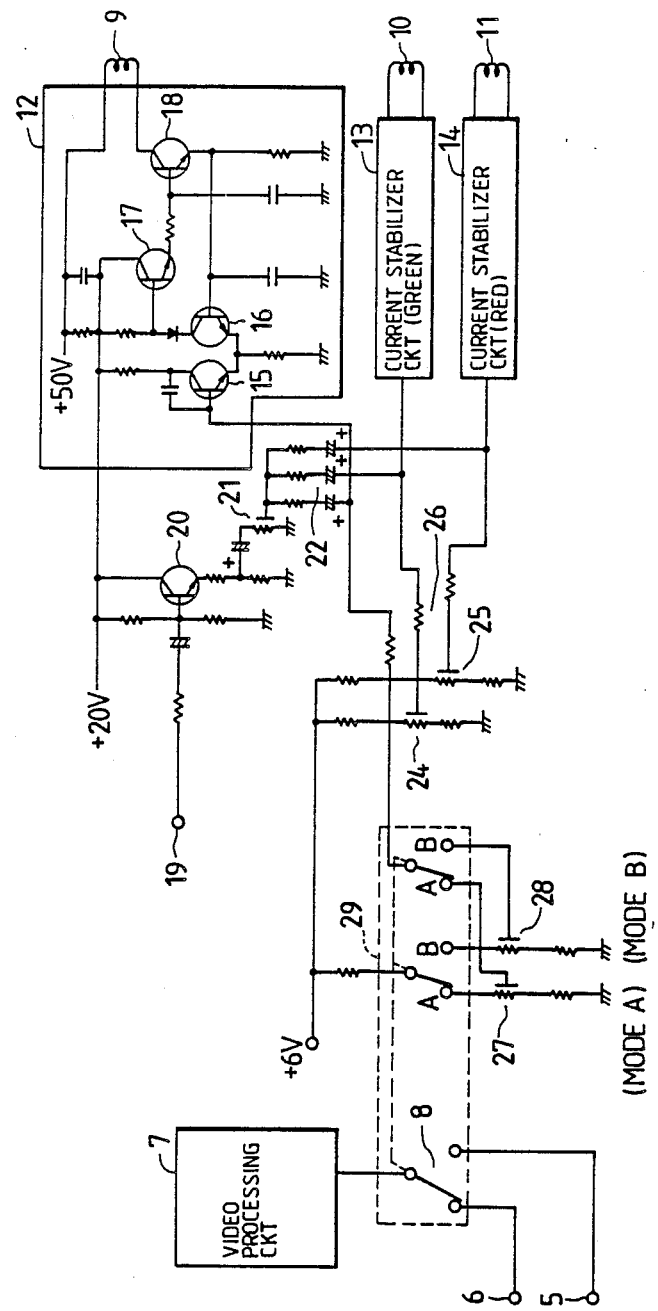

FIG. 4 shows a second embodiment of a focus adjustment changeover circuit according to the present invention. This is similar to the first embodiment described above, but differs in that the mode changeover switch 29 and the input signal changeover switch 8 are mutually linked (i.e. ganged) such that when mode A is selected by the mode changeover switch 29, the crosshatch pattern signal is selected by switch 8 to be supplied from input terminal 6 to the video processing circuit 7, while when mode B is selected by switch 29, the color video signal is selected by switch 8 to be supplied from the input terminal 5 to the video processing circuit 7. Otherwise, the operation of this embodiment is identical to that of the second embodiment described above.

We claim:

1. A focus adjustment changeover circuit for a projection display television receiver, comprising:
   externally operable mode changeover switch means; and,
   circuit means responsive to said changeover switch means, including means for selectively establishing a first mode of operation in which a focus current level is set to provide precise electromagnetic focusing of a cathode ray tube of said projection display television receiver having a blue-emissive phosphor, said circuit means further including means for selectively establishing a second mode of operation in which said focus current level is set to provide an electromagnetically defocused condition of said cathode ray tube of said projection display television receiver having a blue-emissive phosphor;
   and is characterized in that said first mode is selected when projection lens focus adjustment of said projection display television receiver is to be executed and said second mode is selected when white balance adjustment of said projection display television is to be executed.

2. A focus adjustment changeover circuit according to claim 1 in which said projection display television receiver comprises means for generating a test pattern signal and a video signal, and further comprising second changeover switch means coupled to be actuated together with said mode changeover switch means, for selecting said test pattern signal to be utilized to produce a drive signal for said cathode ray tube when said first mode is selected, and for selecting said video signal to be utilized to derive said drive signal for said cathode ray tube when said second mode is selected.

* * * * *